United States Patent
Kinder et al.

(10) Patent No.: US 9,047,105 B2
(45) Date of Patent: Jun. 2, 2015

(54) CONFIGURATION MODELING WITH OBJECTS

(75) Inventors: Cornelia Kinder, Sandhausen (DE); Meinolf Block, Heidelberg (DE); Simon Lueders, Walldorf (DE)

(73) Assignee: SAP AG, Walldorf (DE)

( * ) Notice: Subject to any disclaimer, the term of this patent is extended or adjusted under 35 U.S.C. 154(b) by 98 days.

(21) Appl. No.: 13/346,649

(22) Filed: Jan. 9, 2012

(65) Prior Publication Data

US 2013/0179862 A1 Jul. 11, 2013

(51) Int. Cl.
*G06F 9/44* (2006.01)
*G06F 9/445* (2006.01)

(52) U.S. Cl.
CPC .................. *G06F 9/44505* (2013.01)

(58) Field of Classification Search
None
See application file for complete search history.

(56) References Cited

U.S. PATENT DOCUMENTS 6,574,617 B1 *  6/2003  Immerman et al. .................... 1/1
7,499,933 B1 *  3/2009  Simpson ............................... 1/1

* cited by examiner

*Primary Examiner* — Don Wong
*Assistant Examiner* — Deric Ortiz
(74) *Attorney, Agent, or Firm* — Mintz Levin Cohn Ferris Glovsky and Popeo, P.C.

(57) ABSTRACT

A computer-implemented method, computer program product and system for configuration modeling with objects are disclosed. A base configuration of an application is modeled, to generate a configuration model that specifies parameters, types, structures, and boundary conditions of the base configuration of the application. The configuration model is stored in a database repository as a repository object that can be activated with configuration data. One or more extensions to the base configuration is modeled as one or more configuration model extensions. The one or more configuration model extensions are stored as repository objects linked to the repository object representing the configuration model.

13 Claims, 2 Drawing Sheets

CONFIGURATION MODELING WITH OBJECTS

TECHNICAL FIELD

The subject matter described herein relates to managing configurations of applications, and more particularly to configuration modeling with objects.

BACKGROUND

Applications typically need configuration in order to execute properly within and across application systems. Authors of applications want to ship "default" configurations. And while partner enterprises want to adapt applications and their configurations, customers want to adapt the configurations according to their system-specific needs.

Managing all these requirements concurrently is a difficult task. There have been many different solutions proposed to handle this problem, yet the problem is made more acute with the advent of shared in-memory database systems and multi-tenancy environments that share application and database systems.

SUMMARY

This document describes a system and method providing configuration management of applications using a life-cycle management of an in-memory database (IMDB) repository.

In one aspect, a computer-implemented method and system are described. A method and system execute the steps of modeling a base configuration of an application, the modeling generating a configuration model that specifies parameters, types, structures, and boundary conditions of the base configuration of the application. The steps further include storing the configuration model in a database repository as a repository object that can be activated with configuration data, and modeling one or more extensions to the base configuration as one or more configuration model extensions. The steps further include storing the one or more configuration model extensions as repository objects linked to the repository object representing the configuration model.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide a system and method providing configuration management of applications using a life-cycle management of an in-memory database. In particular, configuration tables are no longer stored, rather, the structure of each configuration is modeled, and the model is stored in a text file. Each model specifies parameters, types, structures, boundary conditions, etc., and is stored in a database repository.

For configurations, an extended version of the general extension concept of the database repository is used. In the general extension concept, extension points in the application code can be used by customers to plug in additional code in order to modify the behavior of the application. Such an extension mechanism gives application programmers maximum control of what application functionality can be modified by the custom code and when the custom code is called. Because adaptations are the normal use-case for configuration, in accordance with some implementations, configurations are modeled. Each application describes, in its associated configuration model, which parameters they need and how these parameters look (value types, structure, cardinality, etc).

A valid configuration adheres to this model and is stored as an independent repository object. The configurations are maintained with a generic configuration editor. Configurations can be stacked: adaptations are done by storing "delta configurations" separately from the (unmodified) base-configuration. Changed configurations must be activated, and the activation always ensures that the base-configuration is read and all existing deltas are applied. The activation stores the effective configuration for most efficient runtime access.

For every application in need of configuration the author must supply a base-configuration. Customers can extend this base-configuration by any number of delta-configurations to tailor the application to their specific needs. A customer configuration may extend the base-configuration or any other customer configuration. This in effect creates a chain of configuration extensions where each chain can be activated into a runtime configuration.

A partner to the author may change the application and also adapt its configuration by extending the base-configuration. If a customer using the author's application attempts to switch to the partner's solution, the references of the customer's configurations to the base-configuration need to be switched to the partner's configuration. The activation of one or more of the customer's existing configurations can then fail due to incompatibilities with the partner's configuration changes and need to be resolved before being able to activate the configuration.

Figure 1:
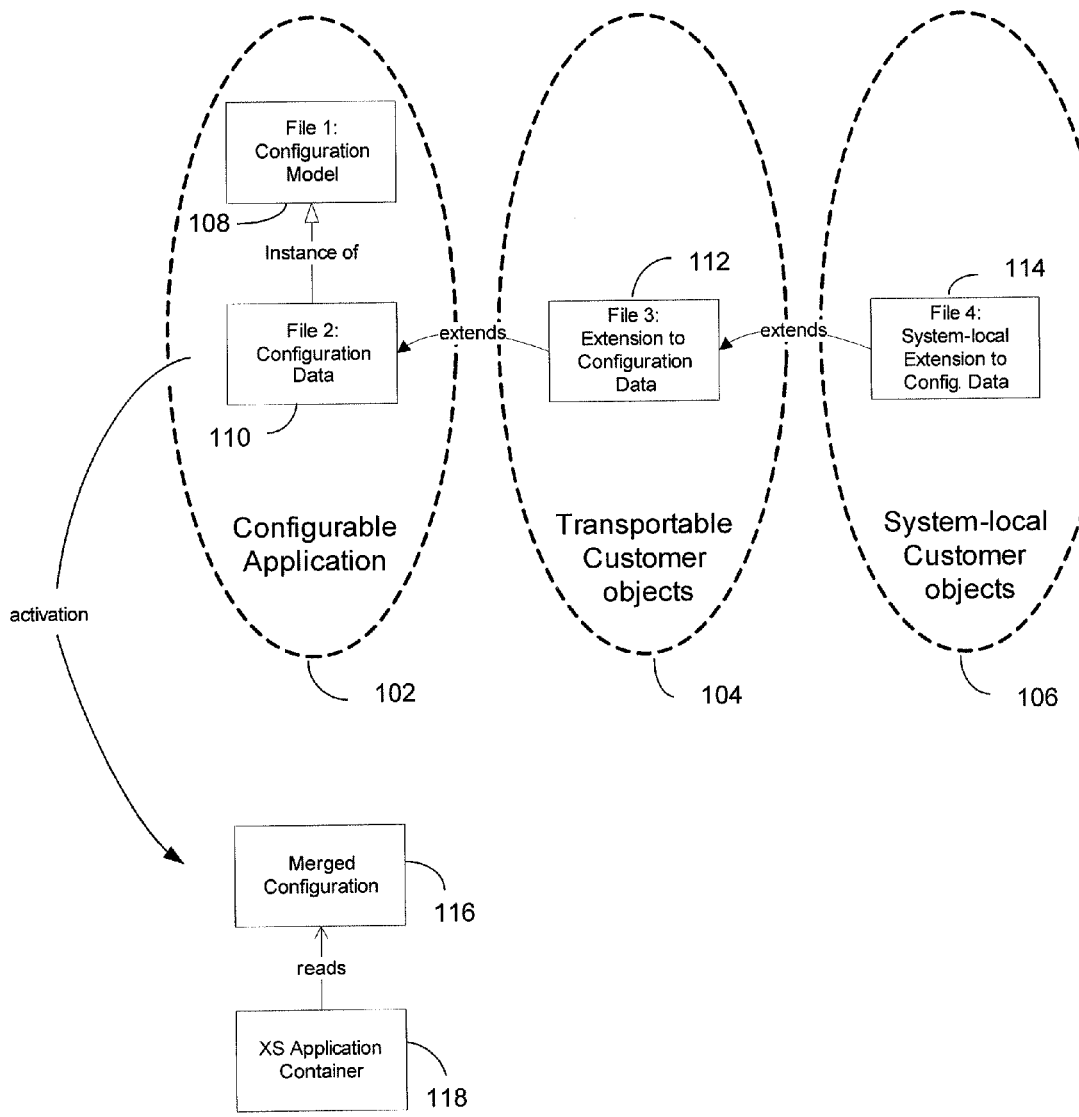
FIG. 1 is a block diagram of a system for configuration modeling with objects.

FIG. 1 illustrates a system 100 for configuration modeling with objects. The system 100 includes one or more configurable applications 102, transportable customer objects 104, and system-local customer objects 106. Each configurable application 102 includes a configuration model 108, that provides an instance for configuration data 110. The transportable customer objects 104 include extensions to configuration data 112, as one or more extensions to the configurable application 102. The system-local customer objects include system-local extensions to configuration data 114, as one or more extensions to the transportable customer objects 104.

An activation code calculates the resulting configuration by merging the information in all participating objects, and stores the result in merged configuration 116 that can be read by an application container 118. Accordingly, the merged configuration 116 is a runtime object that is specific to the application. The running application only evaluates the merged configuration 116 or runtime-configuration. There is no need to evaluate dependencies and merge layered configurations at runtime.

The structure of a configuration model includes a list of variable declarations. These declarations can be nested into structures (struct keyword) to achieve variable grouping. Identifiers are used to give names to variables. An identifier is a sequence of one or more letters, underscore characters, or digits. Variables are stored as one of a number of data types. In some implementations, variables are declared by first its data type and then the variable's identifier after a space. The declaration can be terminated by a semicolon or other symbol.

Variable declarations can be annotated by constraints which may, for example, limit the range of values that can be assigned to a variable. A constraint can also affect the way that the variable can be used. A constraint is given after the variable name in a declaration. There are also some data type specific variable constraints.

The organization of a configuration file can be enhanced by nesting variable structures. Variable identifiers are visible only inside a struct. Using the same identifier for a variable inside the same struct is not allowed. It is possible to re-use a variable's name in a declaration outside of the current struct, e.g. in a sub-struct or parent struct.

Variable lists are collections of elements of the same data type. These elements can be referenced by index in the configuration file. A list is declared by the list keyword followed by the data type in angular brackets and then the variable name.

Variable maps are sorted arrays of unique keys associated with elements of the same data type. Elements are referenced by a string key. A map is declared by the map keyword followed by the data type in angular brackets and then the variable name.

Figure 2:
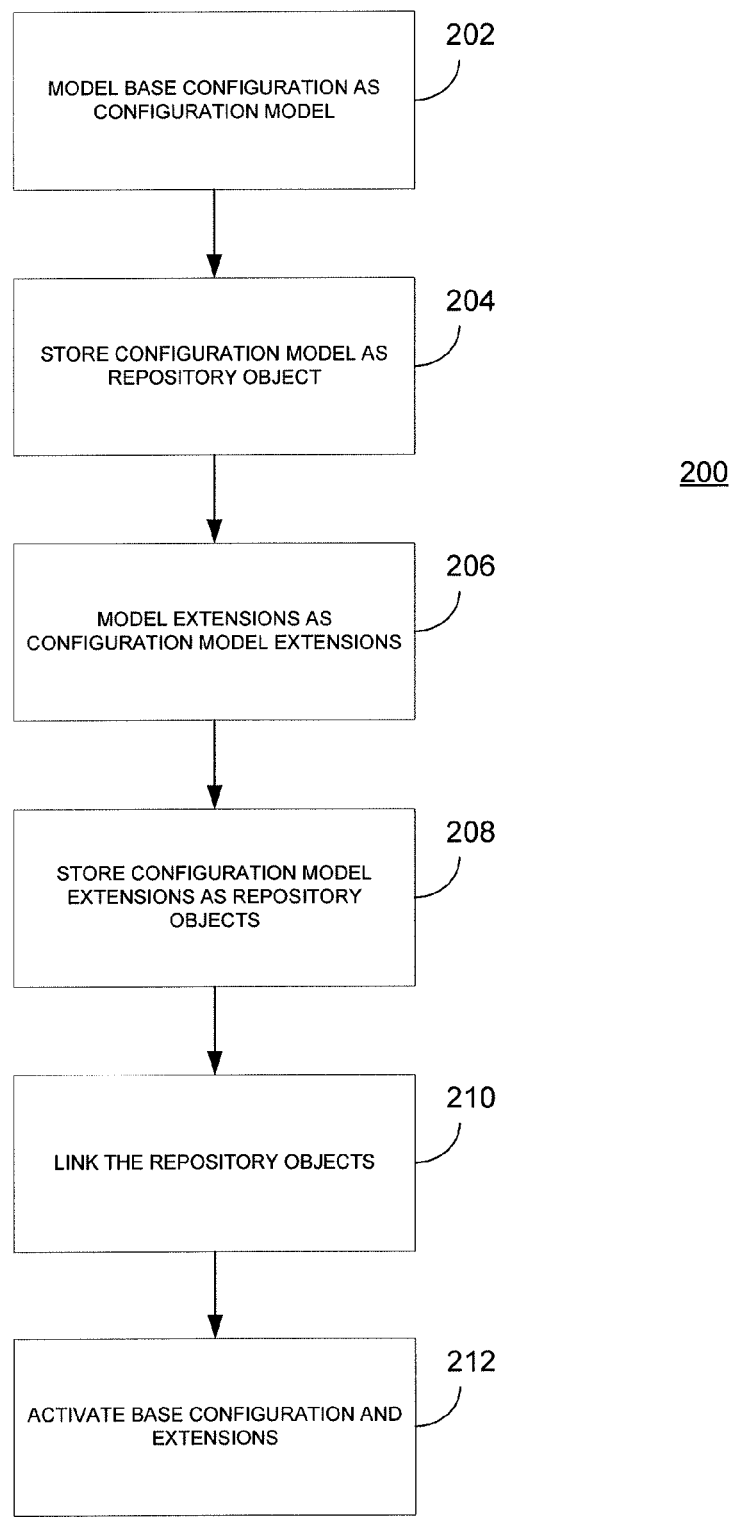
FIG. 2 is a flowchart of a method for configuration modeling with objects.

FIG. 2 is a flowchart of a method 200 for configuration modeling with objects. At 202, a base configuration of an application is modeled as a configuration model, which provides a text-based configuration file and specifies parameters, structures, value types, etc., for the application. At 204, the configuration model is stored as a repository object. At 206, any extensions to the base configuration of the application are modeled as configuration model extensions, and at 208 are also stored as repository objects. At 210, the repository objects are linked to create a chain of configuration extensions from the base configuration, where each chain can be activated, at 212 into a runtime configuration.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    modeling, by one or more processors, a base configuration of an application, the modeling generating a configuration model that specifies parameters, types, structures, and boundary conditions of the base configuration of the application;
    storing the configuration model in a database repository as a repository object that is activated with configuration data;
    modeling one or more extensions to the base configuration as one or more configuration model extensions, which include system-local customer objects having system-local extensions to configuration data;
    storing a merged configuration as a run-time object specific to the application, the merged configuration comprising the repository object and the configuration model extensions, the one or more configuration model extensions comprising additional repository objects stored in the database repository and linked to the repository object representing the configuration model; and
    evaluating the run-time object at run-time by the application, the evaluating occurring without requiring run-time evaluating of dependencies or merging of layered configurations by the application.

2. The method in accordance with claim 1, further comprising linking the repository objects in the database repository.

3. The method in accordance with claim 2, further comprising activating the application by activating the configuration model and the configuration model extensions with the configuration data into a runtime configuration.

4. The method in accordance with claim 1, further comprising:
    providing, by the one or more processors, the configuration model in a text file, the text file being stored as a repository object.

5. The method in accordance with claim 1, wherein the one or more configuration model extensions include transportable customer objects.

6. A computer program product comprising a machine-readable medium storing instructions that, when executed by at least one programmable processor, cause the at least one programmable processor to perform operations comprising:
    model a base configuration of an application, the modeling generating a configuration model that specifies parameters, types, structures, and boundary conditions of the base configuration of the application;
    store the configuration model in a database repository as a repository object that is activated with configuration data;
    model one or more extensions to the base configuration as one or more configuration model extensions, which include system-local customer objects having system-local extensions to configuration data;
    storing a merged configuration as a run-time object specific to the application, the merged configuration comprising the repository object and the configuration model extensions, the one or more configuration model extensions comprising additional repository objects stored in the database repository and linked to the repository object representing the configuration model; and
    evaluating the run-time object at run-time by the application, the evaluating occurring without requiring run-time evaluating of dependencies or merging of layered configurations by the application.

7. The computer program product in accordance with claim 6, wherein the instructions, when executed by at the least one programmable processor, further cause the at least one programmable processor to link the repository objects in the database repository.

8. The computer program product in accordance with claim 7, wherein the instructions, when executed by at the least one programmable processor, further cause the at least one programmable processor to activate the application by activating the configuration model and the configuration model extensions with the configuration data into a runtime configuration.

9. The computer program product in accordance with claim 6, wherein the instructions, when executed by at the least one programmable processor, further cause the at least one programmable processor to provide the configuration model in a text file, the text file being stored as a repository object.

10. The computer program product in accordance with claim 6, wherein the one or more configuration model extensions include transportable customer objects.

11. A system comprising:
    at least one programmable processor associated with an application server; and
    a machine-readable medium storing instructions that, when executed by the at least one processor, cause the at least one programmable processor to perform operations comprising:
    model a base configuration of an application, the modeling generating a configuration model that specifies parameters, types, structures, and boundary conditions of the base configuration of the application;
    store the configuration model in a database repository as a repository object that is activated with configuration data;
    model one or more extensions to the base configuration as one or more configuration model extensions, which include system-local customer objects having system-local extensions to configuration data;
    storing a merged configuration as a run-time object specific to the application the merged configuration comprising the repository object and the configuration model extensions, the one or more configuration model extensions as comprising additional repository objects stored in the database repository and linked to the repository object representing the configuration model;

evaluating the run-time object at run-time by the application, the evaluating occurring without requiring run-time evaluating of dependencies or merging of layered configurations by the application; and activate the application by activating the configuration model and the configuration model extensions with the configuration data into a runtime configuration.

12. The system in accordance with claim 11, wherein the one or more configuration model extensions include transportable customer objects.

13. The method in accordance with claim 1, further comprising providing an extension point in an application code of the application, the extension point accepting additional code for modifying the application.

* * * * *